US006537962B1

(12) United States Patent
Oki et al.

(10) Patent No.: US 6,537,962 B1
(45) Date of Patent: Mar. 25, 2003

(54) COMPOSITE POWDER

(75) Inventors: Kazuo Oki, Wakayama (JP); Takashi Miyaji, Wakayama (JP); Kazuhiro Otsuka, Wakayama (JP); Mikio Sakaguchi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/508,816

(22) PCT Filed: Jul. 14, 1999

(86) PCT No.: PCT/JP99/03816

§ 371 (c)(1), (2), (4) Date: Mar. 17, 2000

(87) PCT Pub. No.: WO00/03948

PCT Pub. Date: Jan. 27, 2000

(30) Foreign Application Priority Data

Jul. 17, 1998 (JP) .......................................... 10-203841

(51) Int. Cl.[7] .......................... C01B 33/32; C11D 3/04; C11D 3/08

(52) U.S. Cl. ...................... 510/531; 510/247; 510/248; 510/269; 510/446; 510/466; 510/492; 510/511; 423/331; 423/332; 423/544; 423/551; 423/554; 252/175; 252/181

(58) Field of Search ................................ 510/531, 247, 510/248, 269, 446, 466, 492, 511; 423/331, 332, 544, 551, 554; 252/175, 181

(56) References Cited

U.S. PATENT DOCUMENTS

| | | | | |
|---|---|---|---|---|
| 4,664,839 A | | 5/1987 | Rieck | 252/175 |
| 5,318,718 A | | 6/1994 | Seiter et al. | 252/174.15 |
| 5,707,960 A | * | 1/1998 | Fukuyama et al. | 510/531 |
| 5,980,580 A | * | 11/1999 | Yamaguchi et al. | 8/137 |

FOREIGN PATENT DOCUMENTS

| | | |
|---|---|---|
| JP | 5-504162 A | 7/1993 |
| JP | A9-194209 | 7/1997 |

OTHER PUBLICATIONS

Japanese Abstract: JP09309179A, Dec. 2, 1997.
Japanese Abstract: JP10046190A, Feb. 17, 1998.
Japanese Abstract: JP07089712A, Apr. 4, 1995.
Japanese Abstract: JP07011293A, Jan. 13, 1995.
Japanese Abstract: JP06157026A, Jun. 3, 1994.
Japanese Abstract: JP06128590A, May 10, 1994.
Japanese Abstract: JP06116592A, Apr. 26, 1994.
Japanese Abstract: JP08026717A, Jan. 30, 1996.
Japanese Abstract: JP08225317A, Sep. 3, 1996.
Japanese Abstract: JP08143309A, Jun. 4, 1996.
Japanese Abstract: JP10291817A, Nov. 4, 1998.
Japanese Abstract: JP10158699A, Jun. 16, 1998.
Japanese Abstract: JP10081509A, Mar. 31, 1998.
Japanese Abstract: JP09194878A, Jul. 29, 1997.
Japanese Abstract: JP09208218A, Aug. 12, 1997.
Japanese Abstract: JP10183195A, Jul. 14, 1998.

* cited by examiner

*Primary Examiner*—Mark Kopec
*Assistant Examiner*—Brian P Mruk
(74) *Attorney, Agent, or Firm*—Birch, Stewart, Kolasch & Birch, LLP

(57) ABSTRACT

The present invention pertains to a composite powder comprising (A) an alkali metal silicate particle having an average particle size of from 1 to 500 μm; and (B) a water-soluble salt particle having an average particle size of from 0.01 to 50 μm, of which solubility to water at 20° C. is 1 g/100 g or more, wherein the alkali metal silicate particle has a composition formula in an anhydride form represented by: $xM_2O.ySiO_2.zMeO$ (I) wherein M stands for Na and/or K; Me stands for Ca and/or Mg; y/x is from 0.5 to 4.0; z/x is from 0 to 1.0; and Mg/Ca in MeO is from 0 to 10, and wherein the composite powder has a (A)/(B) weight ratio of from 1/9 to 99/1; and a detergent composition comprising the composite powder. The composite powder is a composite powder having a remarkably enhanced storage stability of the alkali metal silicate without impairing the ion exchange capacity owned by the alkali metal silicate.

6 Claims, 4 Drawing Sheets

COMPOSITE POWDER

This application is the national phase under 35 U.S.C. §371 of PCT International Application No. PCT/JP99/03816 which has an International filing date of Jul. 14, 1999, which designated the United States of America.

TECHNICAL FIELD

The present invention relates to a composite powder comprising a composite prepared from an alkali metal silicate and a water-soluble salt. More specifically, the present invention relates to a composite powder having a low percentage of weight gain during storage and a small change in state, wherein the alkali metal silicate component has high storage stability.

BACKGROUND ART

Alkali metal silicates are ion exchange materials having cationic exchange capacity, which have been conventionally utilized for detergent builders, and the like. Distinguishable from zeolites, aluminosilicate detergent builders, a feature of the alkali metal silicates resides in their solubility to water. Therefore, they are excellent in the rinsability after the wash, so that there is an advantage that their remaining property to clothes is low, or the like. They also have an alkaline-buffering ability, the function of which the zeolites do not have. In view of the above facts, recently, there has been an active engagement in the development of the silicates having excellent Ca-ion exchange capacity.

However, while the solubility to water, a feature of the alkali metal silicates, is an advantage of the silicates, the alkali metal silicates absorb moisture in the air or absorb carbon dioxide gas, thereby causing a decrease in the ion exchange capacity. In view of the above, there arises a problem that the performance of the above silicates is apt to decrease by storage.

Therefore, as disclosed, for instance, in Japanese Patent Laid-Open No. Hei 9-208218, it has been proposed to increase the storage stability by surface treatment with an organic substance, or the like to coat crystalline silicates. However, when the surface is coated with an organic substance which does not substantially contain water, there are some cases where such an advantage of the crystalline silicates as solubility is inhibited. In addition, as disclosed in Japanese Patent Laid-Open Nos. Hei 8-143309 and Hei 9-309719, there have been proposed processes of increasing water resistance of an alkali metal silicate by treating an amorphous alkali metal silicate with carbon dioxide gas. When this process is employed, the alkali metal silicates are neutralized with acidic carbon dioxide gas, so that silica is formed locally, thereby causing a disadvantage that water-insoluble components increase. In addition, there is also a defect that the alkaline-buffering ability, one of the advantages of the alkali metal silicates, is lowered by the neutralization. In addition, as disclosed in Japanese Patent Laid-Open No. Hei 8-225317, there has been tried to improve anti-hygroscopicity by forming a solid solution of an alkali sulfate in an amorphous silicate. In order to achieve its purpose, the silicate and the alkali sulfate must be melted at a high temperature of 1000° C. or more, which gives rise to such defects that an energy load is high and that it cannot be applied to crystalline silicates, thereby making it poor in the generalized use.

Accordingly, an object of the present invention is to provide a composite powder comprising a composite prepared from an alkali metal silicate and a water-soluble salt, wherein the alkali metal silicate component has high storage stability.

These and other objects of the present invention will be apparent from the following description.

DISCLOSURE OF INVENTION

The present invention pertains to:

[1] a composite powder comprising (A) an alkali metal silicate particle having an average particle size of from 1 to 500 μm; and (B) a water-soluble salt particle having an average particle size of from 0.01 to 50 μm, of which solubility to water at 20° C. is 1 g/100 g or more, wherein the alkali metal silicate particle has a composition formula in an anhydride form represented by:

$$xM_2O.ySiO_2.zMeO \quad (I)$$

wherein M stands for Na and/or K; Me stands for Ca and/or Mg; y/x is from 0.5 to 4.0; z/x is from 0 to 1.0; and Mg/Ca in MeO is from 0 to 10, and wherein the composite powder has a (A)/(B) weight ratio of from 1/9 to 99/1; and

[2] a detergent composition comprising the composite powder as defined in item [1] above.

Figure 1:
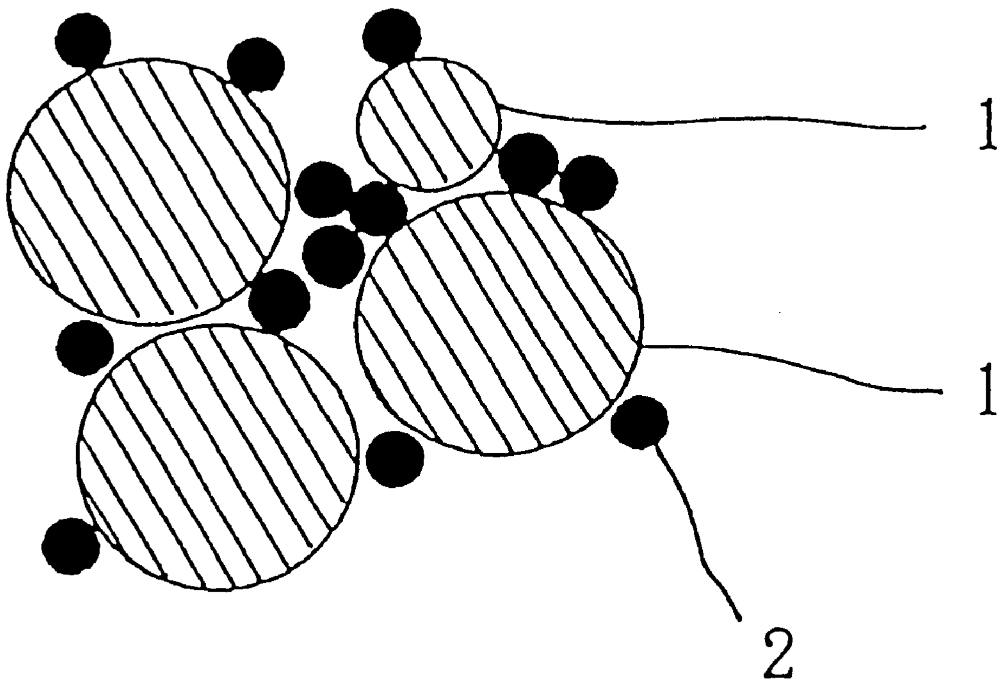
FIG. 1 and FIG. 2 are cross-sectional schematic views of the composite powders of the present invention.

Incidentally, in the figures, 1 stands for an alkali metal silicate particle, and 2 stands for a water-soluble salt particle.

BEST MODE FOR CARRYING OUT THE INVENTION

1. Construction of Composite Powder and Process for Preparing Composite

The composite powder of the present invention is prepared from an alkali metal silicate particle and a water-soluble salt particle. The average particle sizes of the alkali metal silicate particle and the water-soluble salt particle in the composite powder are as follows.

The average particle size of the alkali metal silicate particle is not particularly limited, and the average particle size is preferably 1 μm or more, more preferably 5 μm or more, still more preferably 7 μm or more, from the viewpoints of the dispersibility and the storage stability, and the average particle size is preferably 500 μm or less, more preferably 200 μm or less, still more preferably 50 μm or less, from the viewpoints of the ion exchange speed and the dispersibility to water. In addition, the average particle size of the water-soluble salt particle is not particularly limited, and the average particle size is preferably from 0.01 to 50 μm, more preferably from 0.05 to 30 μm, still more preferably from 0.1 to 20 μm. The average particle size of the water-soluble salt particle is preferably 50 μm or less, from the viewpoint of tightly contacting with the alkali metal silicate particle, and the average particle size is preferably 0.01 μm or more, from the viewpoint of suppressing agglomeration of the water-soluble salt particles with each other. Further, it is preferable that the average particle size of the water-soluble salt particle is smaller than the average particle size of the alkali metal silicate particle, because the composite powder can more easily have a construction in which the water-soluble salt particle is in contact with a surface of the alkali metal silicate particle.

In addition, the size of the composite powder is not particularly limited, as long as the alkali metal silicate particle and the water-soluble salt particle have the sizes within given ranges. For instance, the size of the composite powder is preferably from 1 to 800 μm, more preferably from 5 to 200 μm. The size of the composite powder is preferably 1 μm or more, from the viewpoints of the dispersibility and the storage stability, and the size is preferably 800 μm or less, from the viewpoints of the ion exchange speed and the dispersibility to water.

The average particle sizes of the composite powder and particles such as the alkali metal silicate particle and the water-soluble salt particle in the present invention refer to an average value of directional diameter formed by tangents (Feret diameter) obtained by SEM. It is preferable to observe the particles by SEM, because the alkali metal silicate particle and the water-soluble salt particle are distinguishable, and their contact state can be easily confirmed.

As the composite powder of the present invention, those in which the contact of the alkali metal silicate particle with the water-soluble salt particle can be confirmed are preferable, from the viewpoint of more excellently exhibiting the effects of the present invention. The contact of the two components can be confirmed from the observation by SEM.

A substantial construction of the composite powder of the present invention is not particularly limited, and it is preferable to have a construction such that there are two or more contact sites between the particles of the two components. Examples of the construction include a construction of an assembly in which the alkali metal silicate particle and the water-soluble salt particle are tightly in contact with each other (Construction A); and a construction in which two or more water-soluble particles are in contact with a surface of the alkali metal silicate particle (Construction B). In the case of Construction B, it is preferable that the particle size of the water-soluble salt particle is smaller than that of the alkali metal silicate particle. Especially, it is still more preferable for Construction B to be a construction in which the water-soluble salt particles substantially coat a surface of the alkali metal silicate particle.

Figure 2:
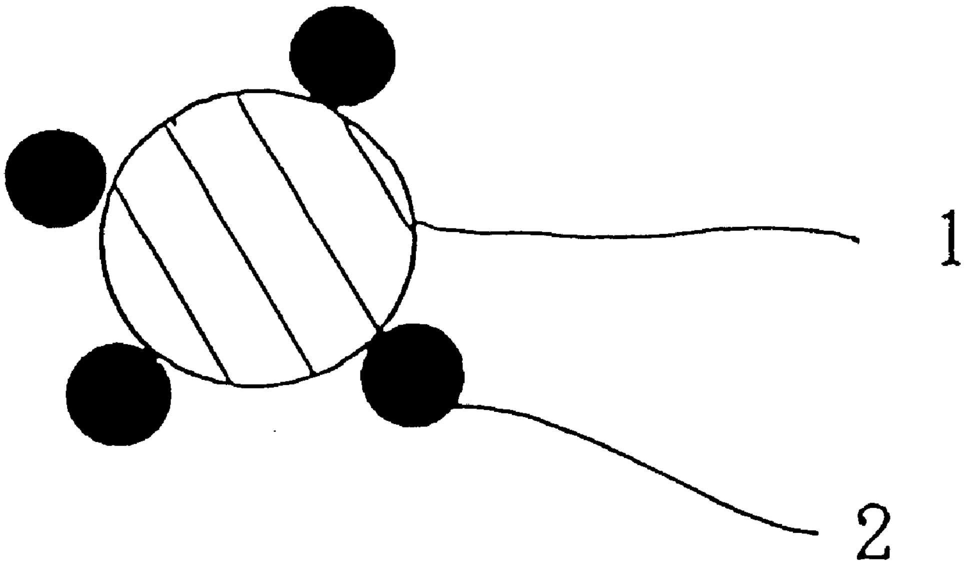

FIG. 1 shows a cross-sectional schematic view of the composite powder of Construction A. FIG. 2 shows a cross-sectional schematic view of the composite powder of Construction B.

As a process for preparing a composite of the composite powder of the present invention, when both of the alkali metal silicate and the water-soluble salt are in the form of particle, these particles may be separately pulverized to a given particle size in advance, and thereafter, both of the particles are mixed by using a mixer, thereby forming a composite powder.

Alternatively, the alkali metal silicate particle and the water-soluble salt particle are placed into a pulverizing device, and the particles may be mixed with pulverizing them. In this case, the average particle sizes of the alkali metal silicate particle and the water-soluble salt particle before pulverization are by no means limited, as long as the resulting composite powder has a size within a given range.

The temperature during mixing and pulverization is not particularly limited, as long as the two components exist in the form of particle, and the temperature may be room temperature or so. Concretely, the temperature is preferably from 50° to 40° C., more preferably from 10° to 30° C.

In addition, the treatment time for mixing and pulverization is not particularly limited. For instance, the treatment time is preferably from 0.5 to 360 minutes, more preferably from 1 to 60 minutes.

In addition, the particle size for each of the alkali metal silicate and the water-soluble salt used as a raw material is not particularly limited, because the particle size of each of the particles in the composite powder can be relatively easily adjusted by setting preparation conditions, and the like. For instance, the particle size of the alkali metal silicate is preferably 1 to 5000 μm, more preferably 5 to 500 μm. In addition, the particle size of the water-soluble salt is preferably 0.01 to 500 μm, more preferably 0.1 to 100 μm. It is preferable that the alkali metal silicate is 1 μm or more, and the water-soluble salt is 0.01 μm or more, from the viewpoint of the handleability, and that the alkali metal silicate is 5000 μm or less and the water-soluble salt is 500 μm or less, from the viewpoint of load alleviation of the powder.

The pulverizing devices and the mixers usable for preparing a composite of the alkali metal silicate particle and the water-soluble salt particle are not particularly limited. Those listed below are preferably usable.

As the pulverizing devices, those pulverizing devices described in *Kagaku Binran* [Edited by Kagaku Kogakukai, p. 826–838 (1998)] are usable, including, for instance, the following:

(1) A device for pulverizing with pressure or impact strength, including, for instance, a jaw crusher, a gyratory crusher, a roller crusher, a roller mill, and the like.

(2) A device in which an impact plate is fixed in the periphery of the rotor rotating at high speed, wherein a product to be treated is pulverized with a shearing force caused between the rotor and the impact plate, including, for instance, a hammer mill, an impact crusher, a pin mill, and the like.

(3) A device in which a roller or balls are rotated with pressing on a ring, wherein a product to be treated is pulverized by smashing it therebetween, including, for instance a ring roller mill, a ring ball mill, a centrifugal roller mill, a ball-bearing mill, and the like.

(4) A pulverizing device comprising a cylindrical pulverization chamber, into which balls or a rod is inserted as pulverization media, wherein the balls or the rod is rotated or vibrated to pulverize a product to be treated, including, for instance, a ball mill, a vibration mill, a planetary mill, and the like.

(5) A device comprising a cylindrical chamber into which pulverization media such as balls or a rod are inserted, wherein a product to be treated is pulverized with shearing and abrasive actions generated by disk-type or annular agitation mechanism inserted into the media, including, for instance, a tower mill, an attritor, a sand mill, and the like.

Next, as to the mixers, those listed below can be exemplified.

(1) A mixer comprising an agitating shaft inside a blending vessel, on which agitating impellers are attached, to carry out blending of powders, including, for instance, Henschel mixer, High-Speed Mixer (manufactured by Fukae Powtec Corp.), and the like.

(2) A continuous mixer comprising a vertical cylinder with a powder supply opening and a main shaft with a blending blade, having a structure such that the main shaft is supported by an upper bearing, and that a discharging side is free, including, for instance, Flexo Mix Mixer (manufactured by Powrex Corp.).

(3) A continuous mixer in which mixing is carried out by supplying a starting material into the upper portion of a disc plate with an agitating pin, and applying a shear force generated by rotating the disc plate at a high speed, including, for instance, Flow Jet Mixer (manufactured by Funken Powtechs, Inc.), and Spiral Pin Mixer (manufactured by PACIFIC MACHINERY & ENGINEERING Co., LTD.).

In addition, the procedures of preparing a composite may be carried out in a state in which the water-soluble salt is a solution or slurry. In this case, it is preferable to carry out the procedures comprising dissolving or dispersing the water-soluble salt in a solvent such as water or an organic solvent, and spraying or adding dropwise the resulting mixture to the alkali metal silicate. By following the procedures described above, the water-soluble salt particle is precipitated on a surface of the alkali metal silicate particle, whereby the composite powder of the present invention can be obtained.

In addition, the composite powder of the present invention may be used as a granule. The average particle size of the granule is not particularly limited, and the average particle size of the granule may be preferably 1000 μm or less, more preferably 500 μm or less, still more preferably from 5 to 200 μm, still more preferably from 5 to 100 μm, from the viewpoint of the dispersibility to water.

When the particle is formed into a granule, the granule can be obtained by pressure-molding the composite powder of the present invention by using the granulating device. The granulating devices include granulating devices by compression granulation mechanism listed in Zoryu Binran [Edited by Nippon Funtai Kogyo Kai, p. 173–197 (1975)]. Concretely, a roller compactor, a briquetting machine, a rotary tableting machine, and the like are preferable.

In addition, the granule of the composite powder may be formed by means of granulating procedures by applying a shearing force to the powder with stirring. Concretely, Henschel mixer (manufactured by Mitsui Mitsuike Machinery Co., Ltd.); High-Speed Mixer (Fukae Powtec Corp.); Vertical Granulator (manufactured by Powrex Corp.), and the like are used to form the granule of the composite powder.

2. Alkali Metal Silicate

In the present invention, the alkali metal silicate particle which forms a composite with the water-soluble salt particle refer to a crystalline or amorphous alkali metal silicate particle, and those having an ion exchange capacity are preferable.

The ion exchange capacity can be measured by a method for measurement of Ca ion exchange capacity described in Examples. The value for the ion exchange capacity is not particularly limited, and the ion exchange capacity is preferably from 10 to 250 mg/g, particularly preferably from 50 to 250 mg/g. It is still more preferably 120 to 250 mg/g, of which range is preferable from the viewpoint of capable of adding to compact detergents, because effectivity can be exhibited with a small amount when utilizing, for instance, as a Ca ion exchange material for detergents.

As the alkali metal silicate having the ion exchange capacity described above, preferable are those of which anhydride form has a composition represented by $xM_2O.ySiO_2.zMeO$ (I) (wherein M stands for Na and/or K; Me stands for Ca and/or Mg; y/x is from 0.5 to 4.0; z/x is from 0 to 1.0; and Mg/Ca in MeO is from 0 to 10).

Examples of the alkali metal silicate having the composition described above include sodium metasilicate, potassium metasilicate, powdery No. 1 sodium silicate, powdery No. 2 sodium silicate, and the like. In particular, as an alkali metal silicate having high ion exchange capacity, there can be exemplified an amorphous alkali metal silicate disclosed in Japanese Patent Laid-Open No. Hei 8-26717 and a crystalline alkali metal silicate disclosed in Japanese Examined Patent Publication No. Hei 1-41116.

As a more preferable alkali metal silicate exhibiting an even higher ion exchange capacity, there is included an alkali metal silicate further having a composition wherein y/x is from 1.0 to 2.1 and z/x is from 0.001 to 1.0 in the above formula (I). As the alkali metal silicate having such a composition, among those having amorphous forms, for instance, the preferable amorphous builders are represented by $xSiO_2.yM_2O.zMe_mO_n$, wherein M stands for an element in Group Ia of the Periodic Table; Me stands for an element in Group IIa, IVa, IIb, IIIb, Vb, or VIII of the Periodic Table, wherein x/y is from 1.0 to 2.0; z/x is from 0.001 to 1.0; n/m is from 1 to 2.5, and have a water content of 8% by weight or less. In addition, among the crystalline alkali metal silicates, the synthetic inorganic builders disclosed in Japanese Gazette No. 2525318 are preferable.

In addition, in the present invention, by using an alkali metal silicate containing potassium, its storage stability can be further improved. As such a preferable composition of the alkali metal silicate containing potassium, there is included a composition further represented such that y/x is from 1.4 to 2.1; z/x is from 0.001 to 1.0; and K/Na in $M_2O$ is from 0.09 to 1.11 in the above formula (I). As such an alkali metal silicate, the crystalline alkali metal silicate disclosed in Japanese Gazette No. 2525342 is cited as a particularly preferable example. The above alkali metal silicate may be used alone or in admixture o two or more kinds.

3. Water-Soluble Salt

The water-soluble salt in the present invention refers to alkali metal salts, alkaline earth metal salts and ammonium salts, which are water-soluble, and is a generic term for salts excluding silicates. Among these salts, particularly preferable are alkali metal salts. In addition, the term "water-soluble" referred herein is those having a water-solubility to water at 20° C. of 1 g/100 g or more.

The alkali metal salt is a salt of an alkali metal selected from Li, Na, K, Rb and Cs. Concrete examples include those having a water-solubility to water at 20° C. of 1 g/100 g or more among Li salts described at pages 147–149, Na salts described at pages 159–165, K salts described at pages 140–146, Rb salts described at page 179, Cs salts described at pages 125–126, each of which is described in Kagaku Binran Revised Third Edition (Basics I) (Edited by Nippon Kagaku Kai). Among them, sulfates, nitrates, carbonates, chlorides and acetates are preferable, and the sulfates are more preferable. In addition, as a cationic seed, Na and Li are preferable, and Li is more preferable. Moreover, as the water-soluble metal salts for more highly exhibiting the effects of the present invention, sodium sulfate, sodium chloride, lithium sulfate, lithium nitrate, lithium acetate and lithium chloride are most preferable.

The alkaline earth metal salt is a salt of an alkaline earth metal selected from Mg, Ca, Ba, and Ra. Concrete examples include those having a water-solubility to water at 20° C. of 1 g/100 g or more among Mg salts described at pages 149–151, Ca salts described at pages 114–117, Ba salts described at pages 109–111, and Ra salts described at page 179, each of which is described in Kagaku Binran Revised Third Edition (Basics I) (Edited by Nippon Kagaku Kai). Among them, sulfates, nitrates, carbonates, chlorides and acetates are preferable, and the sulfates are more preferable. In addition, as a cationic seed, Mg and Ca are preferable, and the best combination is magnesium sulfate.

The ammonium salt includes those having a water-solubility to water at 20° C. of 1 g/100 g or more among the ammonium salts described at pages 156–159 described in Kagaku Binran Revised Third Edition (Basics I) (Edited by Nippon Kagaku Kai). Among them, sulfates, nitrates, carbonates, chlorides and acetates are preferable, and the sulfates and the carbonates are more preferable.

Therefore, the preferable water-soluble salts comprise one kind of a cationic component selected from the group consisting of $Li^+$, $Na^+$, $K^+$, $NH_4^+$and $Mg^{2+}$; and one kind of an anionic component selected from the group consisting of $SO_4^{2-}$, $NO_3^-$, $CO_3^{2-}$, $Cl^-$and $CH_3COO^-$.

The water-soluble salt may be used alone or in admixture of two or more kinds.

4. Storage Stability of Alkali Metal Silicate

One of the evaluation method for storage stability of the alkali metal silicate in the composite powder of the present invention is an evaluation method in which a percentage of weight gain of each of the composite powder of the present invention and the alkali metal silicate is obtained when they are stored in the air of high humidity, and a ratio of the percentages of weight gain is used as an index. The ratio of the percentages of weight gain is defined in Examples. The above ratio of the percentages of weight gain is not particularly limited, and the ratio is preferably 0.8 or less, still more preferably 0.5 or less, from the viewpoint of improvement in the anti-hygroscopicity In addition, the storage stability of the alkali metal silicate can be also evaluated by the storage stability of the ion exchange capacity of the alkali metal silicate. The storage stability of the ion exchange capacity is defined as a value evaluated by the remaining percentage of CEC (cationic exchange capacity) described in Examples. The above remaining percentage of CEC is not particularly limited, and those having a small degree of decrease in the ion exchange capacity during the storage have a higher stability. The above remaining percentage of CEC is not particularly limited, and the remaining percentage of CEC is preferably 20% or more, more preferably 50% or more, still more preferably 85% or more.

Further, when the alkali metal silicate usable in the present invention is a crystalline silicate, the storage stability of the alkali metal silicate can be evaluated by storage percentage of a crystalline phase of the alkali metal silicate, because the crystalline phase greatly influences the ion exchange properties of the alkali metal silicate. The storage percentage of the crystalline phase is defined in Examples. The value for the above storage percentage of the crystalline phase is not particularly limited, and the storage percentage of the crystalline phase is preferably 20% or more, more preferably 40% or more, still more preferably 60% or more. Since the high ion exchange capacity owned by the crystalline alkali metal silicate is closely associated with the storage stability of the crystalline phase, the storage percentage of the crystalline phase is preferably 20% or more.

5. Composite Ratio of Alkali Metal Silicate Particle and Water-Soluble Salt Particle The composite ratio of the alkali metal silicate particle (A) to the water-soluble salt particle (B) is not particularly limited. The weight ratio is preferably (A)/(B)=1/9 or more, from the viewpoint of the ion exchange capacity, and the weight ratio is preferably (A)/(B)=99/1 or less, from the viewpoint of the storage stability. Further, the weight ratio is more preferably (A)/(B)=3/7 to 9/1, particularly preferably (A)/(B)=5/5 to 8/2. In addition, the composite powder having the composite ratio within the above range can be obtained by using each component in the ratio of the above range.

6. Principle for Improving Storage Stability of Alkali Metal Silicate

As a principle for improving the storage stability of the alkali metal silicate in the present invention, it is considered that the improvement in the storage stability is associated with an ion-exchange reaction at the contacted interface between the alkali metal silicate particle and the water-soluble salt particle, which are constituents of the composite powder. Specifically, exchange of cations takes place at the contacted interface between the alkali metal silicate particle and the water-soluble salt particle, so that a surface of the alkali metal silicate particle exhibits relatively high water resistance, whereby the storage stability of the alkali metal silicate is considered to be improved. Further, since it is considered that the ion-exchange reaction takes place at the surface of the alkali metal silicate particle, the ion exchange properties per se of the alkali metal silicate are not substantially impaired. Since the salts constituting the composite powder of the present invention are water-soluble, the dispersibility in water of the alkali metal silicate exhibiting ion exchange capacity is not hindered. Therefore, in the composite powder of the present invention, the storage stability can be improved without inhibiting the ion exchange properties owned by the alkali metal silicate, one of the components of the composite powder.

7. Utilization of Composite Powder

The composite powder of the present invention is a water-soluble, ion exchange material having high storage stability. The utilization method therefor is not particularly limited, and it is preferably utilized as detergent builders. When the composite powder is utilized as a detergent builder, the composite powder may be previously prepared and then added to a detergent. Alternatively, the composite powder previously prepared may be optionally mixed with other detergent components to form detergent granules.

The content of the composite powder in the detergent composition of the present invention comprising the composite powder of the present invention is not particularly limited. The content is preferably 1% by weight or more of the detergent composition, from the viewpoint of exhibiting an effective builder performance, and the content is preferably 30% by weight or less, from the viewpoint of adjusting a pH of the detergent composition to an appropriate range. The application for the detergent composition of the present invention is not particularly limited, and the detergent composition is used as clothes detergents, tableware detergents, house detergents, automobile detergents, toothpastes, body detergents and metalware detergents.

Examples of an anionic surfactant which can be used for the detergent composition of the present invention include salts of sulfuric acid esters of higher alcohols or ethoxylated products thereof; alkylbenzenesulfonates; paraffinsulfonates; α-olefinsulfonates; α-sulfofatty acid salts; and alkyl ester salts or fatty acid salts of α-sulfofatty acids. Here, as the salts, alkali metal salts such as Na salts and K salts are preferable.

The detergent composition of the present invention may further comprise a nonionic surfactant. Examples thereof include ethylene oxide adducts or ethylene oxide adducts/propylene oxide adducts of higher alcohols, fatty acid alkanolamides, alkylpolyglycosides, and the like.

Examples of the builder usable for the detergent composition of the present invention, other than the composite powder of the present invention, include inorganic builders such as carbonates, crystalline aluminosilicates, amorphous aluminosilicates, phosphoric acid salts, and borates; and organic builders such as nitrotriacetates, ethylenediaminetriacetates, tartrates, citrates, and acrylic acid (co)polymers, each of which may be an alkali metal salt of sodium, potassium, and the like.

The detergent composition of the present invention may further comprise cationic surfactants and amphoteric surfactants which are known in the field of clothes detergents; bleaching agents such as percarbonates, perborates and bleaching activators; re-deposition preventives such as carboxymethyl cellulose; softeners; reducing agents such as sulfites; fluorescent whitening agents; defoaming agents such as silicones, and the like.

Since the composite powder of the present invention is a cationic exchange material, it has a function of ion exchange of heavy metals and the like. Therefore, the composite powder can be utilized as agents for wastewater treatment, agents for water treatment and the like. In addition, it can be also utilized as carriers for catalysts which support heavy metals or precious metals. Further, since the composite powder of the present invention is a basic composite powder, it can be also utilized as a basic catalyst.

EXAMPLE 1

To a 50-ml planetary mill made of agate was added 5 g of the alkali metal silicate (500 μm-sieve pass product) shown in Table 1. Thereafter, the alkali metal silicate was pulverized at 8000 rpm for 5 minutes, to give eleven kinds of pulverized alkali metal silicates having an average particle size of 10 to 20 μm. The average particle size of these pulverized alkali metal silicates was obtained as an average value of Feret diameters of 20 or more of the silicates as observed by SEM.

TABLE 1

| Lot | Composition of Alkali Metal Silicate | Compositional Ratio Y/x | z/x | Mg/Ca | Crystal State in X-ray Diffraction |
|---|---|---|---|---|---|
| A | $Na_2O \cdot 1.3\ SiO_2$ | 1.3 | 0 | 0 | Amorphous |
| B | $Na_2O \cdot 1.3\ SiO_2 \cdot 0.026\ CaO$ | 1.3 | 0.026 | 0 | Amorphous |
| C | $Na_2O \cdot 1.6\ SiO_2$ | 1.6 | 0 | 0 | Amorphous |
| D | $Na_2O \cdot 1.6\ SiO_2 \cdot 0.032\ CaO$ | 1.6 | 0.032 | 0 | Amorphous |
| E | $Na_2O \cdot 2.1\ SiO_2$ | 2.1 | 0 | 0 | Amorphous |
| F | $Na_2O \cdot 2.5\ SiO_2$ | 2.5 | 0 | 0 | Amorphous |
| G | $Na_2O \cdot 3.1\ SiO_2$ | 3.1 | 0 | 0 | Amorphous |
| H | $Na_2O \cdot 4\ SiO_2$ | 4 | 0 | 0 | Amorphous |
| J | $Na_2O \cdot SiO_2$ | 1 | 0 | 0 | Crystalline |
| K | $0.748\ Na_2O \cdot 0.252\ K_2O \cdot 1.8\ SiO_2 \cdot 0.054\ CaO \cdot 0.00095\ MgO$ | 1.8 | 0.054 | 0.018 | Crystalline |
| L | $Na_2O \cdot 2\ SiO_2$ | 2 | 0 | 0 | Crystalline |

Figure 3:
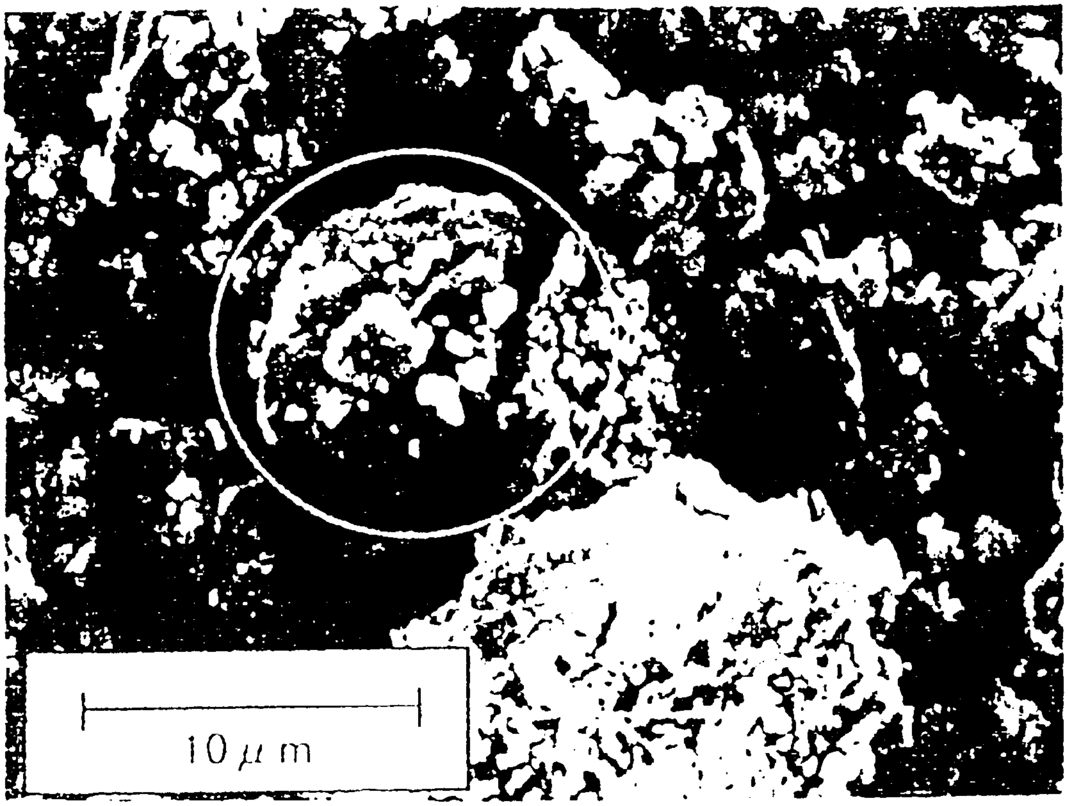
FIG. 3 is a view showing a scanning electron microscope (SEM) image of the composite powder of the present invention.
Figure 4:
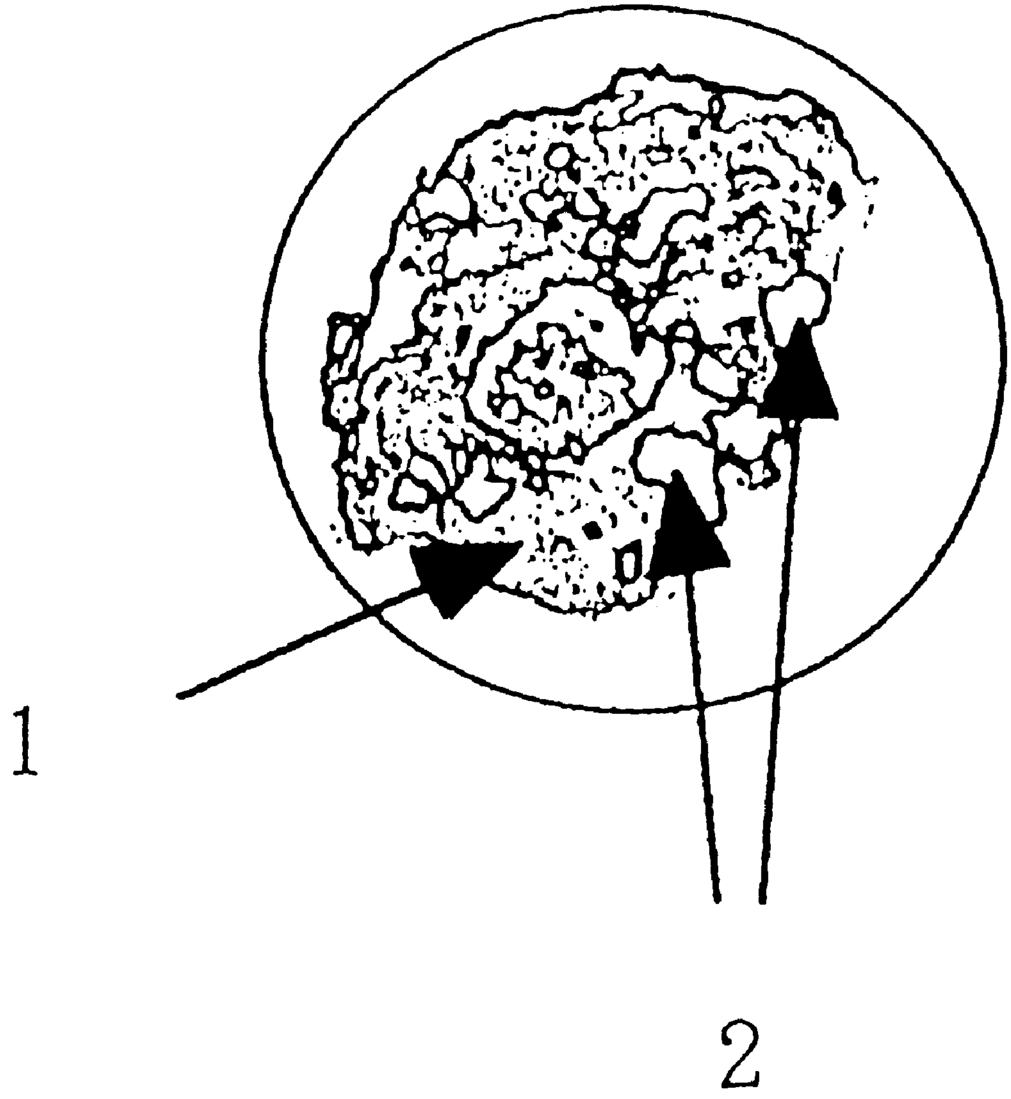
FIG. 4 is a schematic view showing a partial view of FIG. 3.

Separately from the above, to the same kind of the mill as above were added 4 g of the alkali metal silicate (500 μm-sieve pass product) shown in Table 1 and 1 g of lithium sulfate monohydrate (manufactured by Wako Pure Chemical Industries, Ltd., average particle size: 50 μm) at (A)/(B)=80/20. Thereafter, the ingredients were pulverized at 8000 rpm for 5 minutes with mixing, to give eleven kinds of composite powders. In the same manner as in the pulverized alkali metal silicates, each of the resulting composite powders was observed by SEM. It was found that the composite powder has the construction in which two or more lithium sulfate monohydrate particles having an average particle size of from 1 to 5 μm are in contact with a surface of the alkali metal silicate particle having an average particle size of from 8 to 20 μm. FIG. 3 shows an SEM image of Lot. K of the resulting composite powder, and FIG. 4 is a schematic view showing a part thereof.

The Ca ion exchange capacities of the pulverized alkali metal silicate and the composite powder obtained in the manner described above were determined in accordance with the following procedures. The results are shown in Table 2.

TABLE 2

| Lot. | Ca Ion Exchange Capacity (mg/g) Pulverized Alkali Metal Silicate | Composite Powder | Percentage of Weight Gain (%) Pulverized Alkali Metal Silicate | Composite Powder | Ratio of Percentage of Weight Gain |
|---|---|---|---|---|---|
| A | 199 | 156 | 121.2 | 44.5 | 0.37 |
| B | 200 | 163 | 118.7 | 54.4 | 0.46 |
| C | 171 | 146 | 69.7 | 33.8 | 0.48 |
| D | 176 | 150 | 82.9 | 34.5 | 0.42 |
| E | 87 | 77 | 41.9 | 17.3 | 0.41 |
| F | 23 | 14 | 37.7 | 0 | 0 |
| G | 15 | 10 | 21.1 | 1.0 | 0.05 |
| H | 13 | 9 | 20.7 | 0.8 | 0.04 |
| J | 84 | 80 | 139.3 | 64.3 | 0.46 |
| K | 192 | 162 | 68.6 | 1.2 | 0.02 |
| L | 210 | 173 | 58.7 | 0.1 | 0.002 |

Calcium Ion Exchange Capacity

A 0.04 g sample was accurately weighed and added to 100 mL of a calcium chloride aqueous solution (concentration being 100 ppm, when calculated as $CaCO_3$), followed by stirring at 20° C. for 10 minutes. Thereafter, 10 the resulting mixture was filtered with a 0.2 μm filter. The Ca content (amount calculated as $CaCO_3$) in 10 mL of the filtrate was quantified by an EDTA titration. The Ca ion exchange capacity was calculated from the titer.

Next, 0.5 g each of the resulting pulverized alkali metal silicate and the composite powder was weighed out on a petri dish, and stored under environmental conditions of a temperature of 30° C and humidity of 80% for 23 hours, and a percentage of weight gain was calculated by the following method.

$$\text{Percentage of Weight Gain (\%)} = \frac{\text{Weight (g) After Storage} - \text{Weight (g) Before Storage}}{\text{Weight (g) Before Storage}} \times 100$$

Next, the ratio of the percentage of the weight gain of the pulverized alkali metal silicate and the composite powder calculated from the above equation was calculated by the following equation.

$$\text{Ratio of Percentage of Weight Gain} = \frac{\text{Percentage of Weight Gain of Composite Powder (\%)}}{\text{Percentage of Weight Gain of Pulverized Alkali Metal Silicate (\%)}}$$

If the ratio of percentage of weight gain is 0.8 or less, the hygroscopicity of the composite powder can be judged to be lowered, and it is evaluated that the effect of the storage stability by preparing a composite is exhibited. It is clear from Table 2 that in any of the cases the ratios of the percentages of weight gain are remarkably lower than 0.8, so that it was found that the storage stability is improved by the preparation of the composite.

EXAMPLE 2

Composite powders shown in Table 3 were selected from the composite powders of Example 1, and 0.04 g each of the composite powders was accurately weighed and placed on a petri dish, and stored under environmental conditions of a temperature of 30° C. and humidity of 80% for 23 hours. The Ca ion exchange capacity after storage was determined in the same manner as in Example 1.

The remaining percentage of CEC was calculated on the basis of the following calculation equation using the resulting values and the Ca ion exchange capacity values before storage as determined in Example 1. The results are shown in Table 3.

$$\text{Remaining Percentage of CEC (\%)} = \frac{\text{CEC After Storage}}{\text{CEC Before Storage}} \times 100$$

Comparative Example 1

The remaining percentages of CEC for the pulverized alkali metal silicates corresponding to the alkali metal silicates constituting the composite powders selected in Example 2 were determined in the same manner as in Example 2. The results are shown in Table 3. All of the remaining percentages of CEC were lower than those of the composite powders of Example 2.

TABLE 3

| Lot. Of Example 1 | Ca Ion Exchange Capacity (mg/g) Before Storage | After Storage | Remaining Percentage of CEC (%) |
|---|---|---|---|
| | Example 2 | | |
| A | 156 | 55 | 35.3 |
| B | 163 | 46 | 28.2 |
| C | 146 | 63 | 43.2 |
| D | 150 | 96 | 64.0 |
| E | 77 | 40 | 51.9 |
| J | 80 | 43 | 53.8 |
| K | 162 | 162 | 100 |
| | Comparative Example 1 | | |
| A | 199 | 19 | 9.5 |
| B | 200 | 42 | 21.0 |
| C | 171 | 30 | 17.5 |
| D | 176 | 51 | 29.0 |
| E | 87 | 38 | 43.7 |
| J | 84 | 14 | 16.7 |
| K | 192 | 69 | 35.9 |

EXAMPLE 3

To the same kind of the mill used in Example 1 were added 4 g of the crystalline alkali metal silicate (average particle size: 17 μm) having a composition of Lot. K of Example 1 and 1 g of the water-soluble salt shown in Table 4 (average particle size: 50 μm) at (A)/(B)=80/20. Thereafter, the ingredients were pulverized at 8000 rpm for 5 minutes with mixing, to give eleven kinds of composite powders.

TABLE 4

| | Water-Soluble Salt Prepared into Composite | Solubility* | Storage Percentage of Crystalline Phase (%) |
|---|---|---|---|
| Example 3 | $Na_2SO_4$ | 19.4 | 59 |
| | NaCl | 26.38 | 30 |
| | $(NH_4)_2SO_4$ | 42.85 | 60 |
| | $K_2SO_4$ | 10 | 27 |
| | $MgSO_4$ | 25.2 | 55 |
| | $(NH_4)_2CO_3 \cdot H_2O$ | 25 | 37 |
| | $Li_2SO_4 \cdot H_2O$ | 25.8 | 100 |
| | $Li_2CO_3$ | 1.31 | 24 |
| | $CH_3COOLi$ | 300 | 52 |
| | $LiNO_3$ | 42.3 | 85 |
| | LiCl | 45.4 | 83 |
| Comp. Ex. 2 | — | — | 0 |
| Comp. Ex. 3 | $Li_3PO_4$ | 0.039 | 0 |

*: g/100 g $H_2O$ (20° C.)

As a result of observation by SEM, it was confirmed that the resulting composite powder has a construction of an agglomerate in which the crystalline alkali metal silicate particles having an average particle size of from 8 to 15 μm and the water-soluble salt particles having an average particle size of from 0.5 to 7 μm are tightly contacting with each other.

Next, 0.5 g of the resulting composite powder was weighed out on a petri dish, and stored under environmental conditions of a temperature of 30° C. and humidity of 80% for 23 hours. Thereafter, as to the composite powders before and after storage, X-ray diffraction patterns were determined by X-ray diffractometer (manufactured by Rigaku Denki K.K.). Among the resulting diffraction patterns, the storage percentage of the crystalline phase was calculated by the following equation using the values of the peak intensities before and after storage of the crystalline alkali metal silicate appearing in the vicinity of a lattice constant of d=4.08 Å. The results are shown in Table 4.

$$\text{Storage Percentage of Crystalline Phase (\%)} = \frac{\text{Intensity After Storage (cps)}}{\text{Intensity Before Storage (cps)}} \times 100$$

Comparative Example 2

Only the crystalline alkali metal silicate (17 μm), which was the same one used in Example 3, was stored by the same storing method as in Example 3, and the storage percentage of the crystalline phase was determined. The results are shown in Table 4.

Comparative Example 3

The amount 4.0 g of the crystalline alkali metal silicate (17 μm), which was the same one used in Example 3, and 1.0 g of lithium phosphate (50 μm), were pulverized and mixed in the same manner as in Example 3, to give a composite powder comprising crystalline alkali metal silicate particles having an average particle size of 10 μm and lithium phosphate particles having an average particle size of 2 μm. The storage percentage of the crystalline phase of the resulting composite powder was determined. The results are shown in Table 4. Since the solubility of lithium phosphate is low [0.039 g/100 g $H_2O$ (20° C.)], the resulting composite powder had a low storage percentage of the crystalline phase.

Comparative Example 4

A tightly sealed vessel was charged with 4.0 g of the crystalline alkali metal silicate (17 μm), which was the same one used in Example 3, and 1.0 g of sodium sulfate (225 μm) at (A)/(B)=80/20, and the ingredients were mixed with vigorous vibration. The resulting mixture was observed by SEM, and as a result, a tight contact of the crystalline alkali metal silicate particles having an average particle size of 17 μm and sodium sulfate having an average particle size of 225 μm was not found, but rather each of the particles was separately agglomerated. The storage percentage of the crystalline phase of the resulting mixture was determined to be as low as 12%.

EXAMPLE 4

In the same manner as in Example 3, 4.5 g of the crystalline alkali metal silicate (17 μm), which was the same one used in Example 3, and 0.5 g of anhydrous sodium sulfate (50 μm) at (A)/(B)=90/10 were prepared into a composite, to give a composite powder. As a result of the observation by SEM, it was found that the resulting composite powder has a construction of agglomerate in which the alkali metal silicate particles having an average particle size of 10 μm and the anhydrous sodium sulfate particles having an average particle size of 3 μm are tightly contacting with each other. The storage percentage of the crystalline phase of the resulting composite powder was determined to be 36%.

Next, in the same manner as in Example 3, 1.5 g of the crystalline alkali metal silicate (17 μm) and 3.5 g of anhydrous sodium sulfate (50 μm) at (A)/(B)=30/70 were prepared into a composite, to give a composite powder. As a result of the observation by SEM, it was found that the resulting composite powder has a construction of agglomerate in which the alkali metal silicate particles having an average particle size of 12 μm and the anhydrous sodium sulfate particles having an average particle size of 5 μm are tightly contacting with each other. The storage percentage of the crystalline phase of the resulting composite powder was determined to be 82%.

EXAMPLE 5

A tightly sealed vessel was charged with 4.0 g of the crystalline alkali metal silicate (17 μm), which was the same one used in Example 3, and 1.0 g of sodium sulfate (45 μm) at (A)/(B)=80/20, and the ingredients were mixed with vigorous shaking. As a result of the determination by SEM, it was found that the composite powder has a construction of agglomerate in which the crystalline alkali metal silicate particles having an average particle size of 17 μm and the anhydrous sodium sulfate particles having an average particle size of 45 μm are tightly contacting with each other. The storage percentage of the crystalline phase of the resulting composite powder was determined to be 37%.

INDUSTRIAL APPLICABILITY

The composite powder of the present invention is a composite powder having a remarkably enhanced storage stability of the alkali metal silicate without impairing the ion exchange capacity owned by the alkali metal silicate.

The present invention being thus described, it will be obvious that the same may be varied in many ways. Such variations are not to be regarded as a departure form the spirit and scope of the invention, and all such modifications as would be obvious to one skilled in the art are intended to be included within the scope of the following claims.

What is claimed is:

1. A composite powder comprising:

(A) an alkali metal silicate particle having an average particle size of from 1 to 500 μm; and (B) a water-soluble salt particle having an average particle size of from 0.01 to 50 μm, of which solubility to water at 20° C. is 1 g/100 g or more, wherein said alkali metal silicate particle has a composition formula in an anhydride form represented by:

$$xM_2O.ySiO_2.zMeO \quad (I)$$

wherein M stands for Na and/or K; Me stands for Ca and/or Mg; y/x is from 0.5 to 4.0; z/x is from 0 to 1.0; and Mg/Ca in MeO is from 0 to 10, wherein said composite powder has a (A)/(B) weight ratio of from 1/9 to 99/1, and wherein (B) the water-soluble salt particle exists in a form of a particle and contacts the surface of (A) the alkali metal silicate particle.

2. The composite powder according to claim 1, wherein y/x is from 1.0 to 2.1, and z/x is from 0.001 to 1.0 in the formula (I).

3. The composite powder according to claim 1, wherein y/x is from 1.4 to 2.1; z/x is from 0.001 to 1.0; and K/Na in $M_2O$ is from 0.09 to 1.11 in the formula (I).

4. The composite powder according to any one of claims 1 to 3, wherein the water-soluble salt comprises one cationic component selected from the group consisting of $Li^+$, $Na^+$, $K^+$, $NH_4^+$ and $Mg^{2+}$, and one anionic component selected from the group consisting of $SO_4^{2-}$, $NO_3^-$, $CO_3^{2-}$, $Cl^-$ and $CH_3COO^-$.

5. The composite powder according to any one of claims 1 to 3, wherein two or more particles of (B), the water-soluble salt, are brought into contact to a surface of (A), the alkali metal silicate particle.

6. A detergent composition comprising the composite powder as defined in any one of claims 1 to 3.

* * * * *